United States Patent Office 3,449,126
Patented June 10, 1969

3,449,126
FOG STABILIZED PHOTOGRAPHIC EMULSION
Louis M. Minsk, Rochester, N.Y., assignor to Eastman Kodak Company, Rochester, N.Y., a corporation of New Jersey
No Drawing. Filed Dec. 21, 1964, Ser. No. 420,202
Int. Cl. G03c 1/34
U.S. Cl. 96—109                                  6 Claims This invention relates to stabilized photographic compositions, and more particularly, to photographic silver halide emulsions containing novel fog-inhibiting agents.

It is well known that photographic emulsions on storage tend to lose sensitivity and to become spontaneously developable without exposure to light. There is normally a detectable amount of the silver salt reduced during development in the areas where no exposure was given; this is commonly called "fog," and sometimes called "chemical fog" where it is necessary to distinguish between it and the effects of accidental exposure to radiation; in this invention, we are not concerned with the latter.

Fog depends both on the emulsion and the conditions of development; for a given emulsion it increases with the degree of development. With constant development conditions, it tends to increase with time, temperature and relative humidity of storage conditions; it is common practice to make accelerated tests of the stability of photographic emulsions by storage at increased temperature or humidity, or both. It is, of course, desirable to have emulsions as stable as possible under the conditions of high temperature and humidity which may occur in tropical climates, for example. Fog usually appears over the whole area of the sensitive coating, but when severe, it frequently is non-uniform. Fog may also be caused by exposure to chemicals, for example, hydrogen sulfide and other reactive sulfur compounds, hydrogen peroxide vapor, and strongly reducing materials. While antifoggants and stabilizers may protect, to some extent, against such effects, it is normally understood that an antifoggant protects against spontaneous growth of fog during prolonged storage or storage at high temperatures and humidities, or during development to maximum contrast and speed, or both.

It is an object of this invention to provide a new method for stabilizing photographic emulsions.

It is another object of this invention to inhibit fog formation in photographic silver halide emulsions with novel addenda.

It is still another object of this invention to provide novel polymeric antifoggants for photographic gelatino-silver-halide emulsions.

Other objects of this invention will appear herein.

These and other objects of my invention are attained by providing silver halide emulsions containing a polymer having the following repeating units:

Formula 1 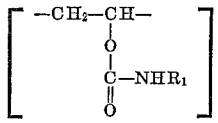

wherein $R_1$ is selected from the group consisting of
—$CH_2COOH$; —$CH(COOH)_2$;

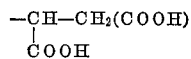

and —$CH_2$—$CH(COOH)_2$. We have found that emulsions containing these polymers have the ability to withstand prolonged high-temperature, high-humidity incubation without the development of objectionable fog.

The polymers which may be used in the invention may be homopolymers having essentially only the repeating units described in Formula 1 above. Also useful are copolymers containing at least 20 weight percent, and advantageously 25 to 50 weight percent, of the repeating units described in Formula 1, the remaining repeating units in the copolymer having the following formula:

Formula 2 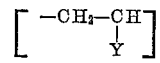

wherein Y represents a photographically inert group such as hydroxyl; an ester such as acetoxy, propionyloxy or butyryloxy; an amide including N-alkyl and N,N-dialkyl amides wherein the alkyl group contains 1 to 5 carbon atoms, e.g., methyl, ethyl, propyl, butyl, or amyl; or, a carbamate group such as —$OCONH$—$R_2$—$COOR_3$ wherein $R_2$ and $R_3$ each are carbon chains of 1 to 5 carbon atoms, preferably alkylene.

My invention will be further illustrated by the following examples. Example 1 shows a method for preparing the polymers of the invention.

EXAMPLE 1

One hundred grams of poly(vinyl alcohol), dried at 50° C., were suspended in 900 ml. of pyridine in a beaker. The suspension was stirred by a "Lightnin" mixer and heated to 95° C. on a hot plate. To the suspension was then added with continued stirring 87½ g. of carbethoxymethyl isocyanate. The temperature of the reaction mixture rose to a maximum of 112° C. and fell to 105° C. over 21 minutes, in which time doping occurred. At this time, a solution of 200 ml. of 10 percent aqueous sodium hydroxide and 200 ml. of distilled water was added. Stirring was continued. In six minutes the dope was no longer alkaline. Fifty milliliters of 10 percent sodium hydroxide was added and two minutes later an additional 30 ml. Fifteen minutes later the reaction mixture was still alkaline. A soft polymer had precipitated. The reaction mixture was allowed to cool to room temperature without stirring, the supernatent liquid was poured off and the precipitate was dissolved in 200 ml. of distilled water. This dope was made acid to congo red with concentrated hydrobromic acid (48 percent) and poured into sufficient acetone (9 liters) to give a soft, workable precipitate. This precipitate was extracted with fresh two-liter portions of acetone until the acetone extracts were colorless. The cake was then dissolved in 500 ml. of distilled water. The dope was filtered through paper by suction and poured into three liters of acetone to precipitate the polymer. The cake was worked with 2-liter portions of 3:1 acetone-water until free from bromide and then with acetone to remove water. The product was dried in a vacuum oven at 30° C. under a constantly applied water pump vacuum. The yield was 90 grams. The analyses were as follows: N, 3.25; carboxyl-equivalent to 1.95 ml. N reagent per gram; bromide, less than 1.

The polymer obtained was incorporated in a high speed, coarse grained silver bromoiodide emulsion of the type normally used in medical X-ray films at a concentration of 43 grams per mole of silver. This emulsion, and a control emulsion which did not contain the polymer, were coated on cellulose acetate supports and dried. Each sample was exposed on an Eastman 1B sensitometer and processed for three minutes in Kodak Developer D-19b, with the following results:

|  | Fresh Test | | | 2 weeks incubation at 120° F., 50% RH | | |
|---|---|---|---|---|---|---|
| Amount of polymer/ Mole Ag | Relative Speed | γ | Fog | Relative Speed | γ | Fog |
| Control | 100 | 2.80 | .08 | 115 | 2.50 | .21 |
| 43 g. | 105 | 2.95 | .10 | 115 | 2.60 | .14 |

It may be seen that the polymer effectively reduced the tendency of the emulsion to fog during prolonged high-temperature, high-humidity incubation.

A modification of the method of preparing the polymers of the invention described in Example 1 is shown in Example 2.

EXAMPLE 2

The preparation of vinyl carboxymethyl carbamate

In a one liter flask equipped with a stirrer, thermometer, reflux condenser and a dropping funnel were placed 360 ml. of pyridine and 44 g. of poly(vinyl alcohol). The stirred suspension was heated to 92° C. in a Glas Col mantle and 195 g. of ethyl isocyanato-acetate were added dropwise over a ¼-hour period. The temperature of the clear light yellow solution was 120° C. Heating and stirring were continued for ½ hour with the temperature dropping spontaneously to 107° C. The dope was cooled to 90° C. and a sample was taken for analysis.

A solution of 60 g. of sodium hydroxide pellets dissolved in 240 ml. of distilled water was added in increments to the stirred dope over a 4½-hour period while heating on a steam bath. Two hundred and fifty ml. of distilled water were added over the same period. At the end of this time the solution remained alkaline to phenolphthalein indicator. At the end of the heating time the polymer was isolated by pouring into ethyl acetate and the oily layer extracted several times with fresh changes of ethyl acetate to reduce the alkalinity. The oil was hardened by washing in acetone and taken up in 200 ml. of distilled water. The aqueous solution was passed through a column containing IR 120 ion exchange resin to remove the sodium ion and to form the free acid of the vinyl carboxymethyl carbamate. The pH of the solution was 2.0 as measured on a Beckman Model G Meter. A sample was taken for analysis. Aqueous sodium hydroxide was added to the dope to adjust the pH to 6.0.

EXAMPLES 3–8

The polymer prepared in Example 2, and similar polymers prepared in the same manner but with varying concentrations of ethyl isocyanatoacetate to produce polymers having different amounts of carbamate groups, were added to coarse grained silver bromoiodide emulsions of the type used in medical X-ray materials at concentrations of 43 g. polymer per mole of silver. The first two polymers were tested in an emulsion containing approximately 2 mole percent iodide and were coated on a cellulose acetate film support at a coverage of 541 mg. silver and 890 mg. gelatin/sq. ft. The other polymer samples were tested in an emulsion containing approximately one mole percent iodide and were coated at a coverage of 562 mg. silver and 930 mg. gelatin/sq. ft. Samples of each coating were exposed before and after incubation on an Eastman 1B Sensitometer and developed for three minutes in Kodak Developer D–19b, fixed, washed and dried to give the following results:

TABLE I.—VINYL CARBOXYMETHYL CARBAMATE POLYMERS

| Compound | Wt. Percent Carbamate Units | Fresh | | | 1 Wk. 120° F., 50% RH | | | 2 Wks. 120° F. 50% RH Fog |
|---|---|---|---|---|---|---|---|---|
| | | Rel. Speed | γ | Fog | Rel. Speed | γ | Fog | |
| Control | | 100 | 1.84 | .06 | 107 | 1.63 | .12 | .81 |
| Example 3 | 28.3 | 105 | 1.70 | .07 | 105 | 1.70 | .11 | .50 |
| Control | | 100 | 1.97 | .07 | 120 | 1.33 | .40 | |
| Example 4 | 44.0 | 107 | 2.08 | .08 | 95 | 1.60 | .16 | |
| Control | | 100 | 2.04 | .08 | 107 | | .26 | .74 |
| Example 5 | 58.7 | 112 | 2.00 | .08 | 118 | | .11 | .18 |
| Example 6 | 69.5 | 102 | 2.08 | .08 | 100 | | .16 | .40 |
| Example 7 | 68.0 | 112 | 2.38 | .08 | 95 | | .16 | .36 |
| Example 8 | 81.7 | 97 | 2.24 | .07 | 94 | | .24 | .56 |

As may be seen in the above table, the polymers of the invention effectively reduced the tendency of the emulsions to fog on prolonged high-temperature, high-humidity incubation.

EXAMPLE 9

The procedure of Example 2 was followed except that diethyl α-isocyanato succinate was substituted for ethyl isocyanatoacetate and a polymer was obtained having 95.5% by weight carbamate units. This polymer was added to an emulsion and tested as in Examples 3–8 except the emulsion was coated at a coverage of 452 mg. silver and 582 mg. gelatin per sq. ft., and the polymer was employed at a concentration of 50 grams per mole of silver. The results are shown in Table II.

TABLE II

| Compound | Wt. Percent Carbamate Units | Fresh Tests | | | | Incubation Tests—50% RH | | |
|---|---|---|---|---|---|---|---|---|
| | | | | | | 1 Wk.-120° | | 2 Wks.-120° |
| | | Rel. Speed | γ | Gross Fog | $D_{max}$ | Rel. Speed | Fog | Fog |
| Control | | 94 | 2.30 | .05 | 1.92 | 129 | .10 | .24 |
| Example 9 | 95.5 | 102 | 2.42 | .10 | 2.10 | 94 | .10 | .13 |

The results demonstrate that the polymer of Example 9 is an effective stabilizer against fog occurring in emulsion on prolonged incubation at high temperature and high humidity.

The polymers of the invention may be incorporated in photographic emulsions over a wide range to impart fog stability, the most useful concentration being from 10 to 75 grams polymer per mole of silver. The emulsions in which the polymers are incorporated may be coated on the usual photographic supports and may contain various chemical sensitizers, stabilizers, speed-increasing compounds, coating aids, hardeners and plasticizers such as those referred to in U.S. Patent 3,039,873.

The polymers of the invention may be derived from various polymers, such as poly(vinyl alcohol). The inherent viscosity of the starting material in water may vary considerably, the most useful viscosities being from 0.20 to 0.90, and preferably from 0.30 to 0.50, at a concentration in water of 0.25 gram per 100 ml. solution.

This invention has been described in detail with particular reference to preferred embodiments thereof, but it will be understood that variations and modifications can be effected within the spirit and scope of the invention as described hereinabove and as defined in the appended claims.

I claim:
1. A photographic silver halide emulsion having incor- porated therein, a polymer containing repeating units having the following formula:

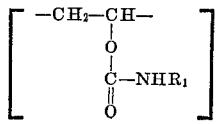

wherein $R_1$ is selected from the group consisting of $-CH_2COOH$, $-CH(COOH)$, $$-CH-CH_2(COOH)\atop\overset{|}{COOH}$$

and $-CH_2-CH(COOH)_2$.

2. A photographic gelatin silver halide emulsion having incorporated therein, in an amount sufficient to effectively inhibit fog during prolonged incubation at high temperature and high relative humidity, a polymer consisting of from 20 to 100 by weight of repeating units having the following formula:

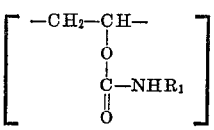

wherein $R_1$ is selected from the group consisting of $-CH_2COOH$, $-CH(COOH)$, $$-CH-CH_2(COOH)\atop\overset{|}{COOH}$$

and $-CH_2-CH(COOH)_2$ and from 0 to 80 percent by weight of repeating units having the following formula:

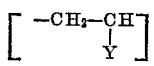

wherein Y represents a photographically inert group.

3. A photographic gelatin silver halide emulsion having incorporated therein, in an amount sufficient to effectively inhibit fog during prolonged incubation at high temperature and high relative humidity, a polymer consisting of from 25 to 50 percent by weight of repeating units having the following formula:

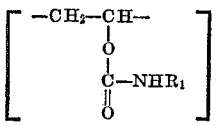

wherein $R_1$ is selected from the group consisting of $-CH_2COOH$, $-CH(COOH)$, $$-CH-CH_2(COOH)\atop\overset{|}{COOH}$$

and $-CH_2-CH(COOH)_2$ and from 75 to 50 percent by weight of repeating units having the following formula:

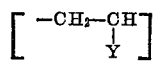

Wherein Y is selected from the group consisting of hydroxyl, N-alkyl amide, N,N-dialkyl amide and $-OCONH-R_2-COOR_3$, and $R_2$ and $R_3$ each are selected from the group consisting of carbon chains of 1 to 5 carbon atoms.

4. A photographic gelatin silver halide emulsion having incorporated therein, in an amount sufficient to effectively inhibit fog during prolonged incubation at high temperature and high relative humidity, a polymer having from 25 to 50 percent by weight of repeating units having the following formula:

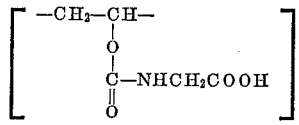

and from 75 to 50 percent by weight of repeating units having the following formula:

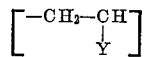

wherein Y is selected from the group consisting of hydroxyl, N-alkyl amide, N,N-dialkyl amide and $$-OCONH-R_2-COOR_3,$$

and $R_2$ and $R_3$ each are selected from the group consisting of carbon chains of 1 to 5 carbon atoms.

5. A photographic gelatin silver halide emulsion having incorporated therein, in an amount sufficient to effectively inhibit fog during prolonged incubation at high temperature and high relative humidity, a polymer having from 25 to 50 percent by weight of repeating units having the following formula:

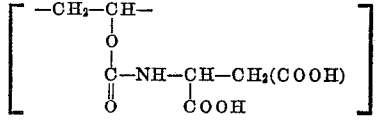

and from 75 to 50 percent by weight of the following repeating unit:

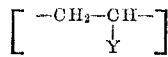

wherein Y is selected from the group consisting of hydroxyl N-alkyl amide, N,N-dialkyl amide and $$-OCONH-R_2-COOR_3,$$

and $R_2$ and $R_3$ each are selected from the group consisting of carbon chains of 1 to 5 carbon atoms.

6. A photographic support having coated thereon an emulsion as described in claim 2.

References Cited

UNITED STATES PATENTS 3,316,097    4/1967    Minsk et al. _____ 96—114

NORMAN G. TORCHIN, *Primary Examiner.*

R. E. FICHTER, *Assistant Examiner.*

U.S. Cl. X.R.

96—114